April 3, 1962  F. L. DAVIS  3,027,614
END CONNECTION FOR CARGO TIEDOWN CHAIN
Filed June 8, 1960
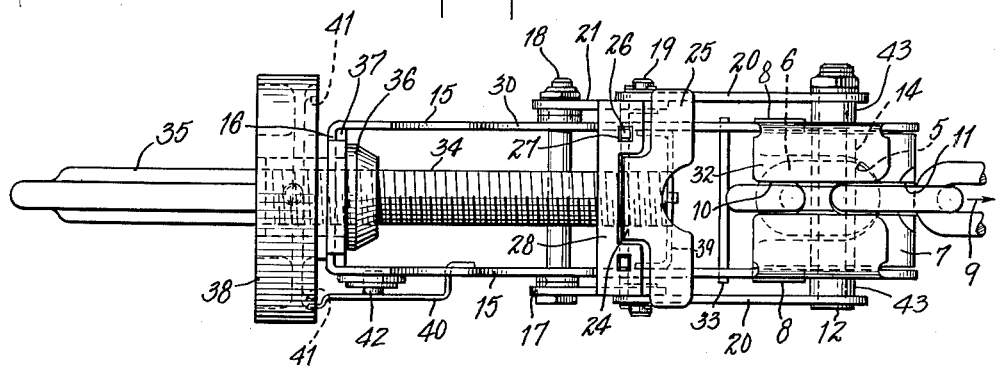
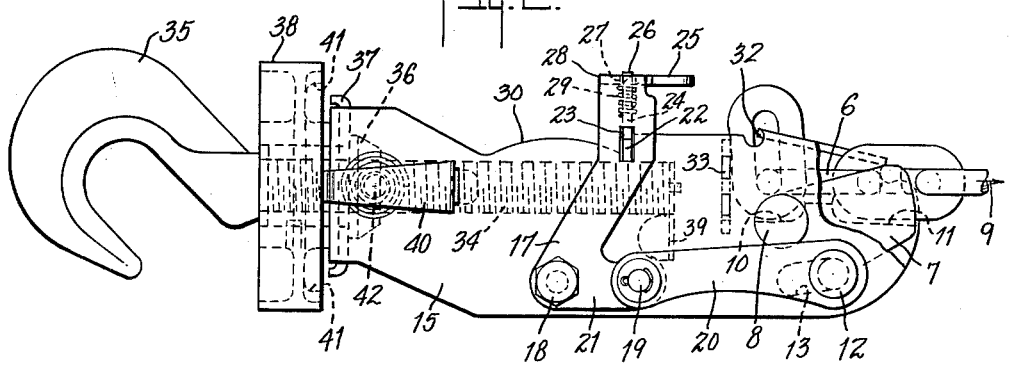
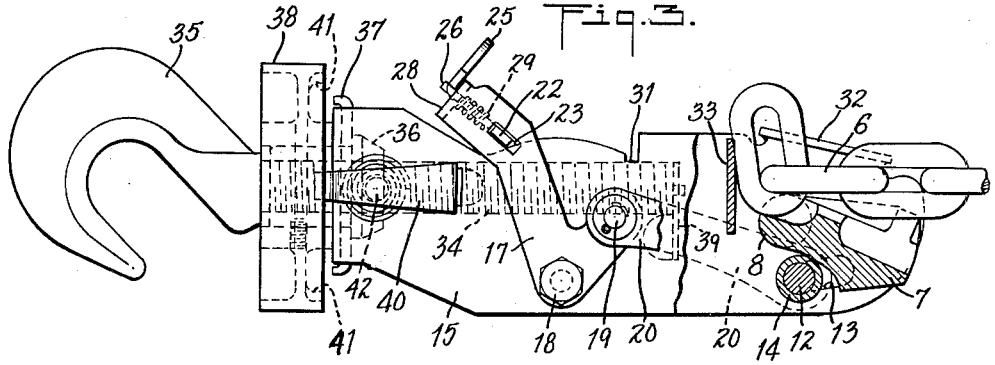
INVENTOR.
FRANK L. DAVIS
BY
ATTORNEY 3,027,614
END CONNECTION FOR CARGO
TIEDOWN CHAIN
Frank L. Davis, 129—07 7th Ave., College Point, N.Y.
Filed June 8, 1960, Ser. No. 34,711
5 Claims. (Cl. 24—116)

The invention herein disclosed relates to cargo tiedowns of the type using chain as the flexible holding medium.

Objects of the invention are to provide a practical end connection for such chain, which will be quickly applicable to and removable from the chain, which can be connected to the chain at any point in the length of the chain to suit requirements of the load, which will be light in weight and small in size but capable of more than carrying any load the chain may bear.

Particularly it is a purpose of the invention to provide an end connection of such characteristics which will be safe in holding the chain and protected against release of the chain or slackening such as might be caused by vibration.

Other special objects of the invention are to provide an end fitting for the chain which can be made up for the most part of readily assembled simple sheet metal parts that can be produced at low cost.

Other desirable objects attained by the invention and the novel features of construction, combination and relation of parts by means of which such objects are accomplished are set forth and will appear in the course of the following specification.

The drawing accompanying and forming part of this specification is illustrative of a present commercial embodiment of the invention. Structure however may be modified and changed as regards this illustration, all within the true intent and scope of the invention as hereinafter defined and claimed.

FIG. 1 in the drawing is a top plan view of one of the connectors showing it connected with a chain.

FIG. 2 is a side elevation of the same.

FIG. 3 is a part sectional side view showing the connector tripped or opened to release or to receive the chain.

The connector illustrated is designed to be attached to the chain by the insertion of a link in the chain into a pocket shaped to hold it flat in the line of the chain load.

This pocket is shown at 5, in the general shape and size to receive a chain link 6, formed in a block 7, pivoted at 8, to stand in line with or parallel to the line of pull 9, of the chain.

Opposite ends of the holding pocket are intersected by cross slots 10 and 11 to accommodate links in advance of and in back of the holding link 6.

The holding link is supported in the holding position in line with the chain pull by a cross bar 12, riding in slots 13, inclined to lift the block to the supporting position or to drop it down or away into the chain releasing position, FIG. 3.

To reduce friction and assure easy positive action, the supporting bar is shown surrounded by a rotatable sleeve 14.

Support for the parts described is provided in the illustration by a one-piece yoke form of frame made up of spaced parallel side plates 15, connected at one end by head portion 16. The pivots 8, for the tumbler are shown in the form of integral trunnions journaled in the side plates, and the inclined slots 13, for the cross bar 12, are shown formed in these side plates.

Actuation of the tumbler supporting and release bar 12, is effected in the illustration by an arched form of lever having side arms 17, pivoted at 18, on the sides of the frame and carrying offset pivots 19, to which are connected links 20, engaged with the cross bar 12.

The pivoted links 20, form with the leverage extensions 21, which carry pivots 19, toggles which in straightened relation shown in FIG. 2, will hold the tumbler locked in chain holding position and which in the broken relation shown in FIG. 3, will hold the tumbler block in the chain release relation.

To lock the parts in the chain securing position shown in FIGS. 1 and 2, latch mechanism is provided in the form of a cross bar 22, guided in slots 23, in the side portions 17, and having an intermediate part 24, extended upward and turned over at an angle to form a hand grip 25.

The latch bar 22, is further equipped with extensions 26, projecting upward through guide openings 27, in the top bar 28, of the arched handle member, these projections in the nature of guide pins being surrounded by springs 29, which thrust the latch bar down over cam formations 30, on the upper edges of the sides of the frame.

These cam edges 30, of the frame are shown as terminating in notches 31, into which the latch bar may drop at the end of the toggle straightening movement to lock all parts in the position shown in FIG. 2.

To lock the holding link in its seated position in the tumbler, the upper edges of the frame are turned inwardly over the top of the tumbler as shown at 32, at an angle to closely overlie the link holding pocket in the upper supported position of the tumbler, as shown in FIG. 2.

Also these link retaining flanges 32, are so disposed that, in the lowered release position of the tumbler, the chain may be drawn into position and the holding link be engaged in the pocket without difficulty.

The sides of the frame are rigidly secured in spaced parallel relation at the open end of the frame by a spacer 33, located close to the tumbler and serving as shown in FIG. 2, as a wall for holding an advance link or links clear of the actuating handle 25.

The frame, equipped with the chain attaching means described at one end, is provided at the opposite end with means for connecting it with the anchorage with which it is to be used.

In the illustration, this attaching means takes the form of a screw bolt 34, carrying a hook 35, at the outer end and operating through a sleeve nut 36, in engagement with an abutment plate 37, engaged over the closed end of the yoke frame.

A hand wheel 38, fixed to the sleeve nut 36, at the outer side of the frame enables in and out adjustment of the hook in respect to the frame, and a sliding cross piece 39, fixed to the inner end of the screw 34, holds the latter against turning while adjustments of the hand wheel and screw sleeve are being made.

To lock the hand wheel in adjusted relation, there is provided a spring pawl 40, fixed on one side of the frame, FIG. 1 and projecting into engagement with ratchet teeth 41, provided in the inner side of the hand wheel. This pawl is normally held engaged with the ratchet teeth by a spring supported push button 42, which will yield to thumb pressure to free the hand wheel from control of the holding pawl.

After the connector has been attached to the chain and the hook engaged with the tiedown anchorage, such as a ring bolt or the like, the hand wheel 38, may be turned to take up slack. Thereafter loosening, such as might otherwise be occasioned by vibration, is prevented by the holding pawl 40. At any time, the hand wheel may be turned to take out slack and, if need be, tension on the load may be released by pressing on the pawl and turning the hand wheel in the reverse, tension relieving direction.

To attach the connector to the chain, it is only necessary to pull up on the handle 25, to release the latch bar 22, from the holding notch 31, and then shift the hand lever 17, from the FIG. 2 to the FIG. 3 position. This breaks the toggle formed by connecting links 20, 21, and shifts the cross bar 12, from the supporting position, permitting the tumbler block to drop from the FIG. 2 to the FIG. 3 position, inclining the holding pocket 5, away from the load line and fully clear of the overstanding guard flanges 32, where a link of the chain may be readily inserted. Then by rocking the hand lever 17, and detent handle 25, combination to the right from the FIG. 3 position, the toggles 20, 21, at the opposite sides of the frame will be straightened, causing cross bar 12, to rise in the cam slots 13, and lift the tumbler 7, to the link holding position lined up with the chain and the holding link safely confined in that relation by the overstanding guard flanges 32.

The latch bar automatically locks the parts in this chain attached condition. Slack may be taken up by turning the hand wheel 38 in one direction or be relieved by releasing the latch 40, and turning the hand wheel in the opposite direction.

Release of the load can be instantly effected by simply lifting the handle 25, to unlatch the detent 22, and permit hand lever 17, to be swung to the left from the FIG. 2 to the FIG. 3 position.

The guard flanges 32, in addition to confining the holding link in its seat or pocket, reinforce the side walls of the frame. Additional, lateral, reinforcement is provided by the spacer sleeve 14, surrounding the tumbler supporting bar 12, which is interposed between the side walls of the frame and the shorter spacing sleeves or tubular washers 43, on the outer ends of the bar between the outer sides of the frame and the toggle links 20.

The one-piece yoke frame and other parts may be made up out of sheet metal.

The rocker or tumbler may be a one-piece substantial block with the holding link seat milled or otherwise sunk in the upper face of the same, leaving sufficient of a retaining wall in the forward or outer end of the same to carry in excess of the full chain load.

What is claimed is:

1. An end connector for tiedown chain comprising a frame having substantially parallel sides, a chain holding block pivoted between the sides of said frame, said block having a chain link confining pocket disposed in the line of load of chain to be connected therewith, a stationary guard on the frame overstanding said chain link holding pocket in the block, said block having pivotal movement toward and away from said guard to confine a link against escape from said pocket or to shift the pocket to a position where a link will be freed of the guard and may be released from said pocket, the sides of said frame having slots therein inclined in respect to the pivotal axis of the block, a bar slidable in said slots and engageable with said block to rock it toward and away from said guard, toggle forming links connected with said bar for shifting the bar in said slots, and an actuating handle connected with said toggle links.

2. An end connector for tiedown chain comprising a frame having substantially parallel sides, a chain holding block pivoted between the sides of said frame, said block having a chain link confining pocket disposed in the line of load of chain to be connected therewith, a stationary guard on the frame overstanding said chain link holding pocket in the block, said block having pivotal movement toward and away from said guard to confine a link against escape from said pocket or to shift the pocket to a position where a link will be freed of the guard and may be released from said pocket, the sides of said frame having slots therein inclined in respect to the pivotal axis of the block, a bar slidable in said slots and engageable with said block to rock it toward and away from said guard, toggle forming links connected with said bar for shifting the bar in said slots, an actuating handle connected with said toggle links, a latch on said handle, and a cooperating keeper on the frame located to releasably secure the handle in the toggle straightened position of said toggle forming links.

3. An end connector for tiedown chain comprising a frame having substantially parallel sides, a chain holding block pivoted between the sides of said frame, said block having a chain link confining pocket disposed in the line of load of chain to be connected therewith, a stationary guard on the frame overstanding said chain link holding pocket in the block, said block having pivotal movement toward and away from said guard to confine a link against escape from said pocket or to shift the pocket to a position where a link will be freed of the guard and may be released from said pocket, the sides of said frame having slots therein inclined in respect to the pivotal axis of the block, a bar slidable in said slots and engageable with said block to rock it toward and away from said guard, toggle forming links connected with said bar for shifting the bar in said slots, and an actuating handle connected with said toggle links, said link confining guard comprising flanges on the sides of said frame overstanding opposite sides of the chain link receiving pocket but spaced apart at the center of the frame for free passage of chain links therebetween while engaging the connector with or releasing it from a length of chain.

4. End connection for tiedown chain, comprising a longitudinally extended frame having means at one end for connecting it with an anchorage and means at the opposite end for connecting it with a chain, the latter means including a tumbler journalled in the frame and having a chain link confining pocket disposed to locate a confined link in line with the load on the chain, a stationary guard on the frame overstanding said link confining pocket for retaining the link confined in said pocket, and tumbler securing means shiftable on the frame to maintain said tumbler with the link confining pocket in line with the load on the chain and the link retained in said pocket by said overstanding guard or to permit said tumbler to swing away from said load line and away from said guard to permit release of the load carrying link from said link confining pocket, said last mentioned tumbler securing means including a tumbler engaging and supporting bar and toggle links for shifting said bar into and out of tumbler supporting position.

5. The invention according to claim 4, with latch mechanism for releasably securing said toggle links in position to retain said tumbler engaging and supporting bar in tumbler supporting position.

References Cited in the file of this patent
UNITED STATES PATENTS

| | | |
|---|---|---|
| 384,960 | Church et al. | June 26, 1888 |
| 781,067 | Hewitt | Jan. 31, 1905 |
| 1,032,252 | Thompson | July 9, 1912 |
| 1,317,605 | Thompson | Sept. 30, 1919 |
| 2,014,201 | Field | Sept. 10, 1935 |
| 2,903,767 | Huber | Sept. 15, 1959 |

FOREIGN PATENTS

| | | |
|---|---|---|
| 440,735 | Italy | Oct. 18, 1948 |